United States Patent [19]

Beacon et al.

[11] Patent Number: 5,039,174

[45] Date of Patent: Aug. 13, 1991

[54] EMPTY/LOAD BRAKING SYSTEM FOR RAILROAD CARS AND VALVE THEREFOR

[75] Inventors: Robert G. Beacon, Sparta; Robert Shepherd, Hamburg; Neal Dauber, Lake Hopatcong, all of N.J.

[73] Assignee: Ellcon National, Inc., Totowa, N.J.

[21] Appl. No.: 452,279

[22] Filed: Dec. 15, 1989

[51] Int. Cl.⁵ .................................. B60T 8/18
[52] U.S. Cl. ..................... 303/22.7; 303/22.6
[58] Field of Search .............. 303/22.2, 22.4-22.7

[56] References Cited

U.S. PATENT DOCUMENTS

| | | | |
|---|---|---|---|
| 3,671,086 | 6/1972 | Scott | 303/22.2 |
| 3,838,893 | 10/1974 | Dalibout et al. | 303/22.6 |
| 3,883,188 | 5/1975 | Wickham | 303/22.2 |
| 3,960,411 | 6/1976 | Beacon | 303/22.2 |
| 4,235,478 | 11/1980 | Billeter | 303/22.2 |
| 4,364,609 | 12/1982 | Wickham | 303/22.2 |
| 4,648,661 | 3/1987 | Schmitt | 303/22.2 |
| 4,801,179 | 1/1989 | Hintner | 303/22.6 X |
| 4,826,259 | 5/1989 | Biegel | 303/22.2 |

FOREIGN PATENT DOCUMENTS 2604143 8/1976 Fed. Rep. of Germany ..... 303/22.2

Primary Examiner—Robert J. Oberleitner
Assistant Examiner—Alfred Muratori
Attorney, Agent, or Firm—Brooks Haidt Haffner & Delahunty

[57] ABSTRACT

Empty/load braking apparatus for individually controlling the braking of the trucks of railway cars and an empty/load valve unit for such use and adapted to be mounted on each truck. The valve unit has a body with a canister as a part thereof or secured thereto with a changeover spool in the body and operable by a load sensing arm, with an air passageway extending between an inlet for receiving pressurized air from the conventional air line and an outlet for connection to a brake cylinder, with a proportional spool for controlling the air passing through the passageway, with a release spool for quick release of air from the brake cylinder upon brake release and with a check valve for preventing the entrance of air into the canister from the braking apparatus during brake release.

16 Claims, 8 Drawing Sheets

EMPTY/LOAD BRAKING SYSTEM FOR RAILROAD CARS AND VALVE THEREFOR

BACKGROUND OF THE INVENTION

The invention relates to an empty/load braking apparatus for railway cars and to an empty/load valve for such apparatus.

The principal purpose of the invention is to provide a variation in the braking forces, by way of the air supply to the brake cylinder of a car, or of an individual truck supporting the car body or bodies, when the car or individual truck unit is either under load or empty.

Braking systems for railway cars in which the braking force applied to the wheels of all the trucks of a car or to the wheels of individual trucks dependent upon the load on the car or on the individual trucks are known in the art. See, for example, U.S. Pat. Nos. 1,615,366; 4,648,661; 4,775,197 and the patents cited in the application therefor; and 4,826,259.

One of the problems in the prior art is to provide an empty/load valve system which is relatively simple and in the case of control of the braking of individual trucks, which is small enough to mount on equipment associated with a truck, e.g. a bolster associated with the truck. U.S. Pat. No. 4,648,661 discloses a valve system for the latter purpose, but such valve system has certain disadvantages such as the need for mechanical contact of the sensing arm with a portion of the truck whether or not the load is being measured and the use of a plunger operated by the sensing arm which mechanically engages a valve element which controls the pressure of the air supplied to a brake cylinder. Also, the valve itself has numerous elements some of which are required to divert air to a reservoir when the pressure controlling valve is released by said plunger.

Another problem sometimes encountered with prior art valve systems is that the brake cylinder pressure is not released quickly enough to meet AAR rules and regulations.

SUMMARY OF THE INVENTION

One object of the invention is to provide an empty/load valve which, with only minor load sensing hardware which is interchangeable and which may be mounted in a wide variety of locations on the car, thus allowing the car builder greater car design latitude.

A further object of the invention is an empty/load system which is compact and self-contained with all the required valve functions, air direction and control, and light (car or truck) equalizing canister or reservoir in a single assembly.

A further object of the invention is an empty/load valve which provides faster air brake release by a more rapid air venting from the cylinder and equalizing canister.

Yet a further object of the invention is an empty/load valve which provides a method whereby the brakeman can visually determine the functional position (empty or load braking) of the individual valve.

The preferred embodiment of the valve unit of the invention comprises a body with a canister as a part thereof or secured thereto, a changeover spool in the body and operable by a sensing rod or arm which senses the load, a passageway extending between an inlet for receiving air under pressure from the conventional air line to an outlet for connection to a brake cylinder or cylinders, a proportional spool controlling the air passing through said passageway, release spool for quick release of the brake cylinder air when the brakes are released and a check valve to prevent air from entering the canister from the braking apparatus during release of the brakes.

Other objects and advantages of the present invention will be apparent from the following detailed description of the presently preferred embodiments thereof, which description should be considered in conjunction with the accompanying drawings in which:

Figure 1:
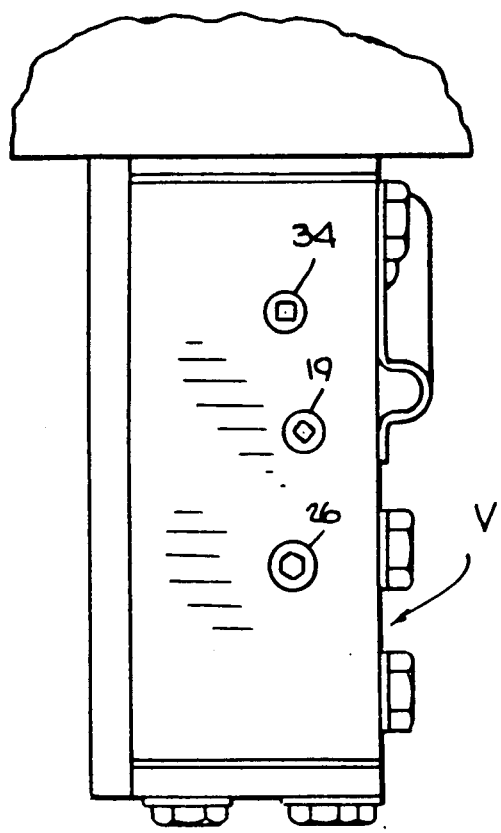
FIG. 1 is an end view of the valve body of the valve of the invention.

The reference numerals 1-48 in FIGS. 1-5 refer to the following parts:

| Ref. Numeral | Part Description |
| --- | --- |
| 1 | Top Gasket |
| 2 | Hex. Bolt |
| 3 | Spacer |
| 4 | Spring |
| 5 | Spool |
| 6 | Gasket Ass'y. |
| 7 | Housing Ass'y. |
| 8 | Rod |
| 9 | Top Cap |
| 10 | O-Ring |
| 11 | Lockwasher |
| 12 | O-Ring |
| 13 | C's'k. Hd. Cap Screw |
| 14 | Proportional Spool |
| 15 | Spring |
| 16 | Bottom Gasket |
| 17 | Bottom Cap |
| 18 | Hex. Screw |
| 19 | Pipe Plug (⅛) Soc. Hd. |
| 20 | Check Valve |
| 21 | Valve Body |
| 22 | Lockwasher |
| 23 | Indicator Ass'y. |
| 24 | Nameplate |
| 25 | Spool Stop |
| 26 | Pipe Plug (¼) Soc. Hd. |
| 27 | O-Ring |
| 28 | Cover |
| 29 | Rivet |

-continued

| Ref. Numeral | Part Description |
| --- | --- |
| 30 | Spacer |
| 31 | Spool |
| 32 | Filter Washer |
| 33 | Spring |
| 34 | Sq. Hd. Pipe Plug |
| 35 | Air Inlet/Outlet from ABDW Valve (Supply Pipe #3) |
| 36 | Air Oulet to Brake Cylinder |
| 37 | Lower Proportional Spool Cavity |
| 38 | Lower Porting Cavity |
| 39 | Lower Release Spool Cavity |
| 40 | Lower Change Over Cavity |
| 41 | Change Over & Release Cavity & Channel |
| 42 | Release & Change Over Cavity & Channel |
| 43 | Release & Proportioning Cavity |
| 44 | Upper Proportioning Cavity & Canister Channel |
| 45 | Canister Chamber |
| 46 | Proportioning & Brake Cylinder Cavity & Channel |
| 47 | Indicator Plunger |
| 48 | Indicator Plunger Spring |

DETAILED DESCRIPTION OF EMBODIMENTS OF THE INVENTION

FIGS. 1 through 5 show one embodiment of the valve in which the load is sensed by way of the resilient gasket 6 which is engageable by the car loading and depressed by the actual car lading in the loaded condition, causing the rod 8 to restrict the travel of the changeover spool 5 and thus causing the valve to respond under "loaded car" condition.

This configuration of the valve actuation would be used on cars carrying bulk lading such as coal, sand or like material. Typically, the valve V can be mounted on a hopper slope sheet or the car bottom where the resilient gasket would be exposed directly to the lading.

As described hereinafter, actuation of the rod 8 may be accomplished by other means, such as an actuation arm, which would then sense relative travel of any sprung versus unsprung car body or truck parts, which travel is a result of the normal suspension of the car and its reaction to the weight of the lading.

Whichever method of actuation is selected by the car builder for best serving his specific design needs, the operation of the valve, it will be understood, functionally is the same.

Under the above-described "loaded car" condition of brake application, air supplied by a conventional reservoir and control valve, known to those skilled in the art, enters the empty/load valve through the inlet 35 (FIG. 4) and thus charges cavities 37, 38, 39 and 40 (FIGS. 4 and 3), all of which are in communication by way of channels in the body of the valve V.

As pressure builds in the said cavities 37–40, the changeover spool 5 is urged upward (see FIG. 2) against its spring 4. Assuming loaded car condition, gasket 6 will be depressed by the lading and thus limit the upward travel of rod 8 and spool 5. Changeover spool 5 is thus prevented from admitting air to the "light car" valve cavity inlet 41.

Since cavity 39 is pressurized by the above-described air charge, release spool 31 (FIG. 3) is urged upward against its spring 33 communicating "empty condition" cavity 42 with cavity 41 but the changeover spool 5, it will be recalled, has been so restricted in the travel (FIG. 2) by rod 8 that resilient seals 12 prevent any entry of charged air into the "empty condition" cavities or channels.

Figure 4:
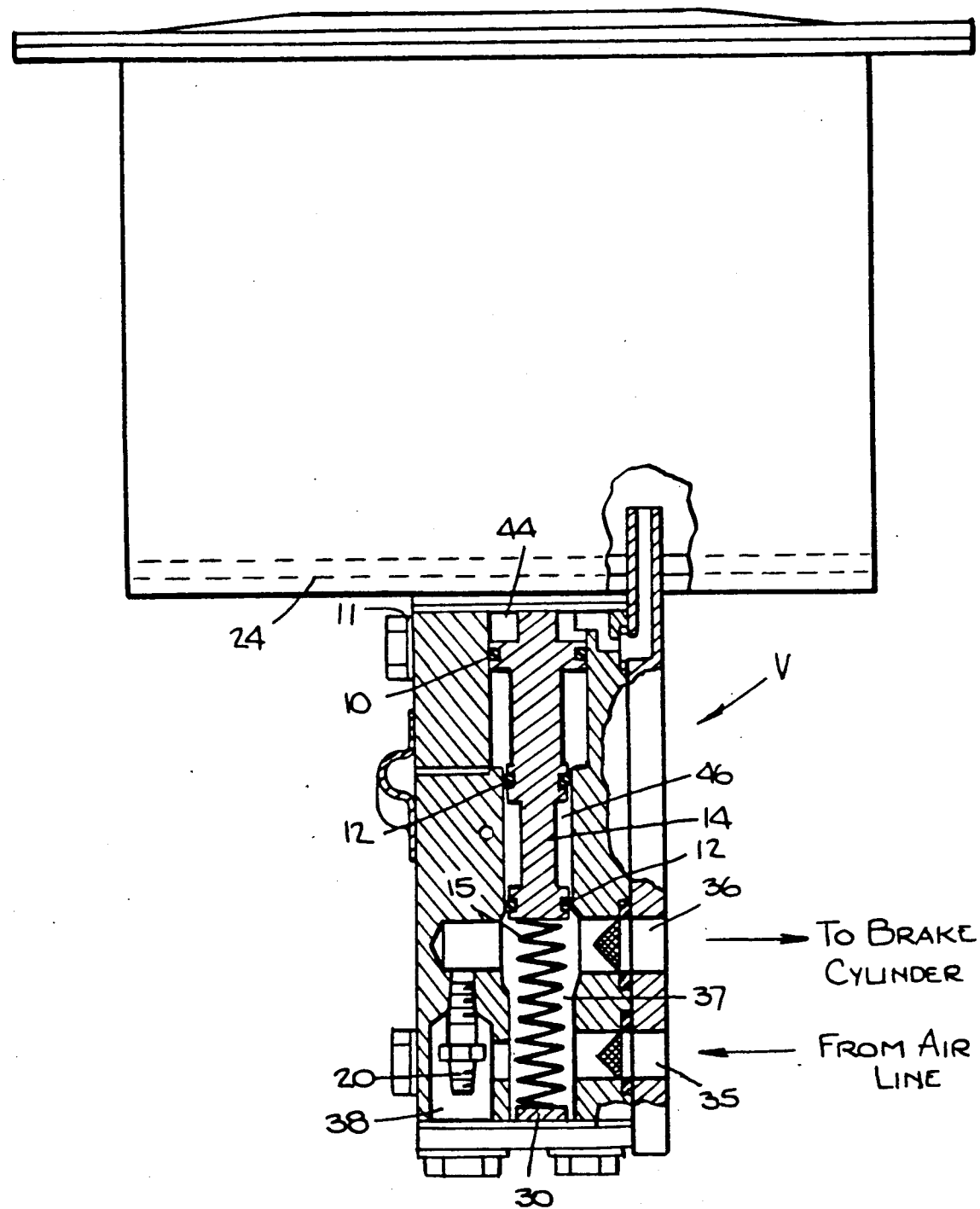
FIG. 4 is a partial section of the valve body taken through the proportioning spool area, i.e. at the section line 4—4 indicated in FIG. 2.
Figure 6:
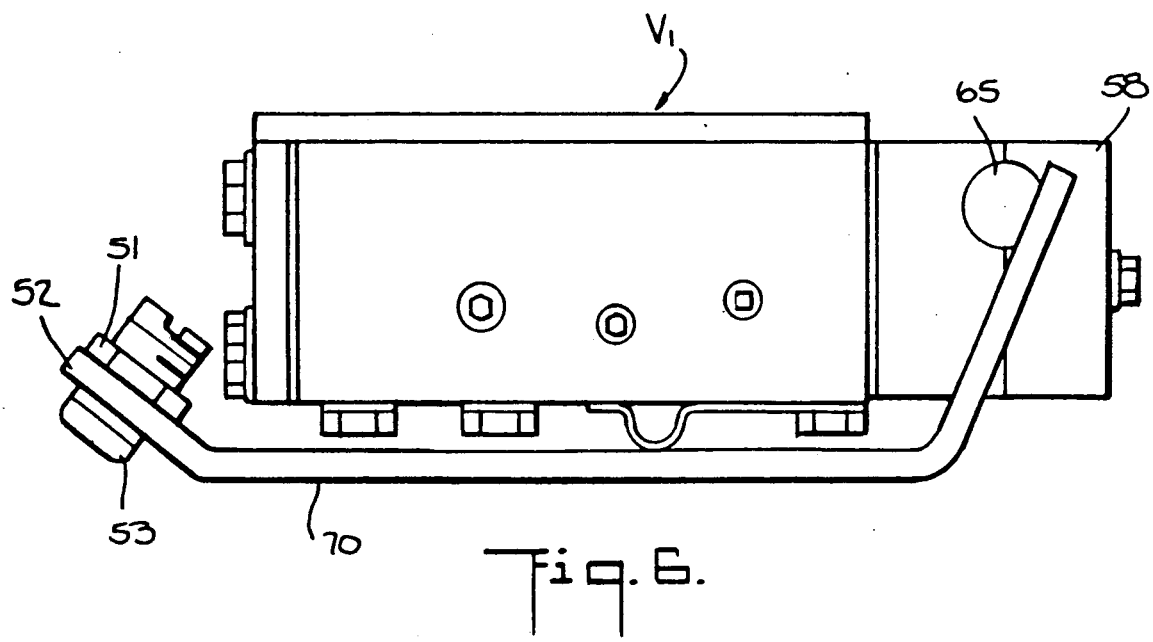
FIG. 6 is a side view of the valve of the invention with the addition of an actuating arm for load sensing.
Figure 7:
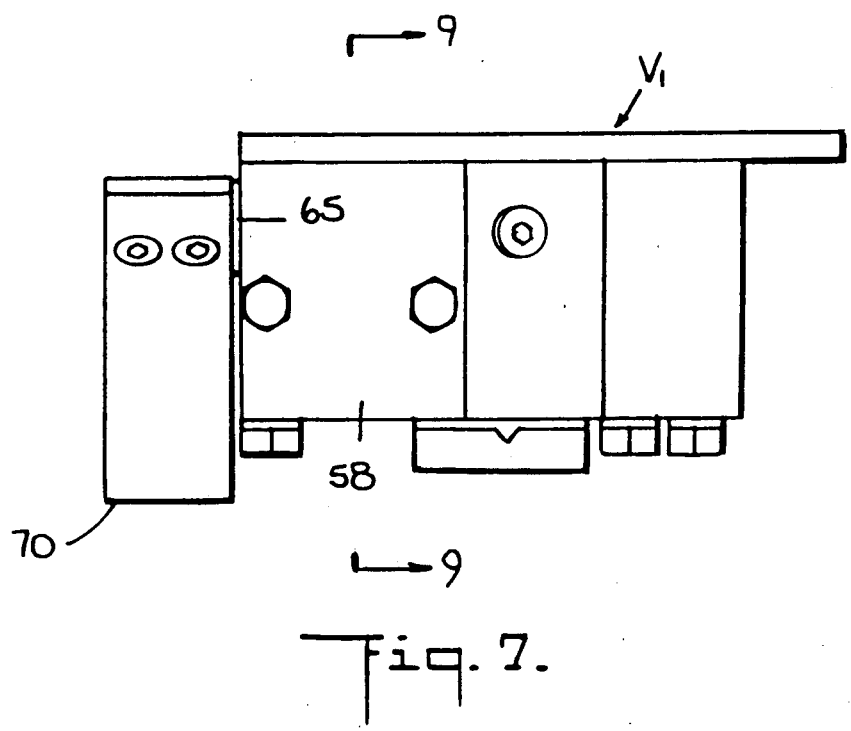
FIG. 7 is an end view of the embodiment shown in FIG. 6.
Figure 8:
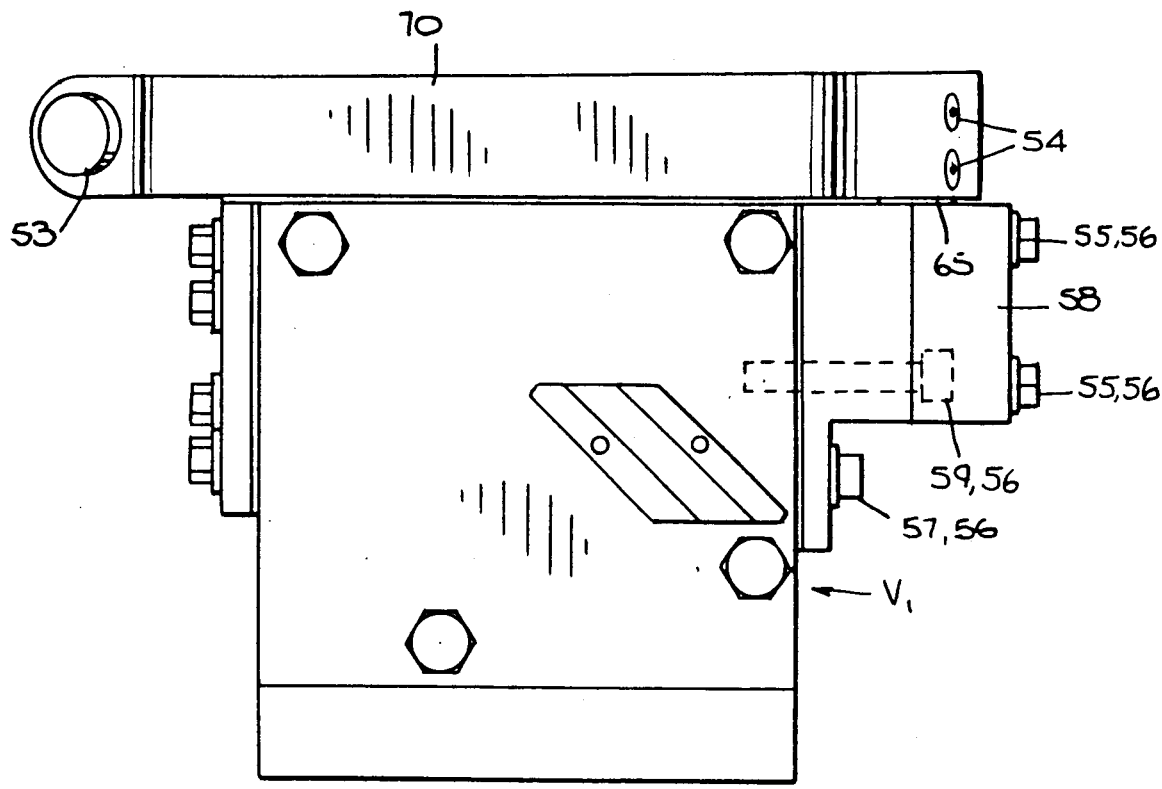
FIG. 8 is a top view of the embodiment shown in FIG. 6.
Figure 9:
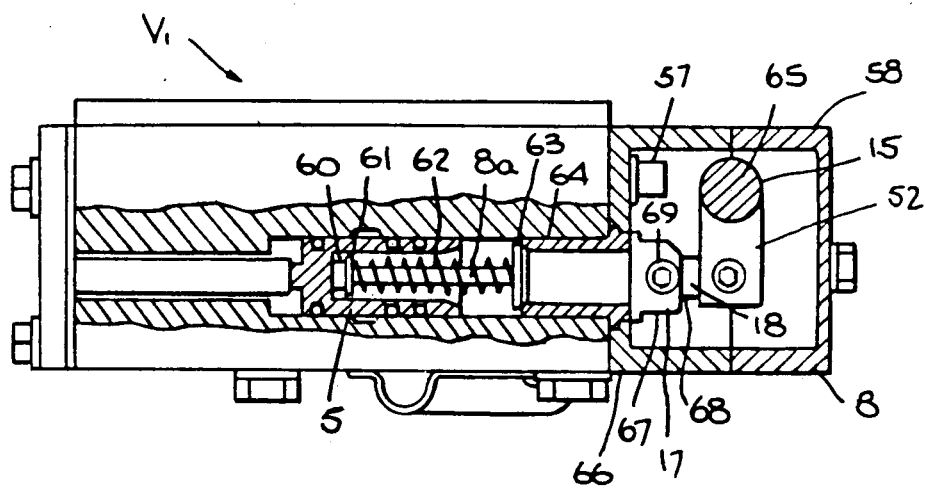
FIG. 9 is a partial section of the embodiment shown in FIG. 6 and is taken along the line 9—9 indicated in FIG. 7.

It can be seen in FIG. 4 then, that 100% of the air charge passes through chamber 37 and exits port 36 (FIG. 4) to the actuating brake cylinder for actuating the brakes of a truck or trucks.

If the car is not loaded and the resilient gasket 6 remains in the position shown in FIG. 2, the valve will respond as follows:

The above-described air charge from the standard air reservoir and valve enters port 35 again charging cavities 37, 38, 39 and 40 by way of the interconnecting channels to these cavities.

Figure 2:
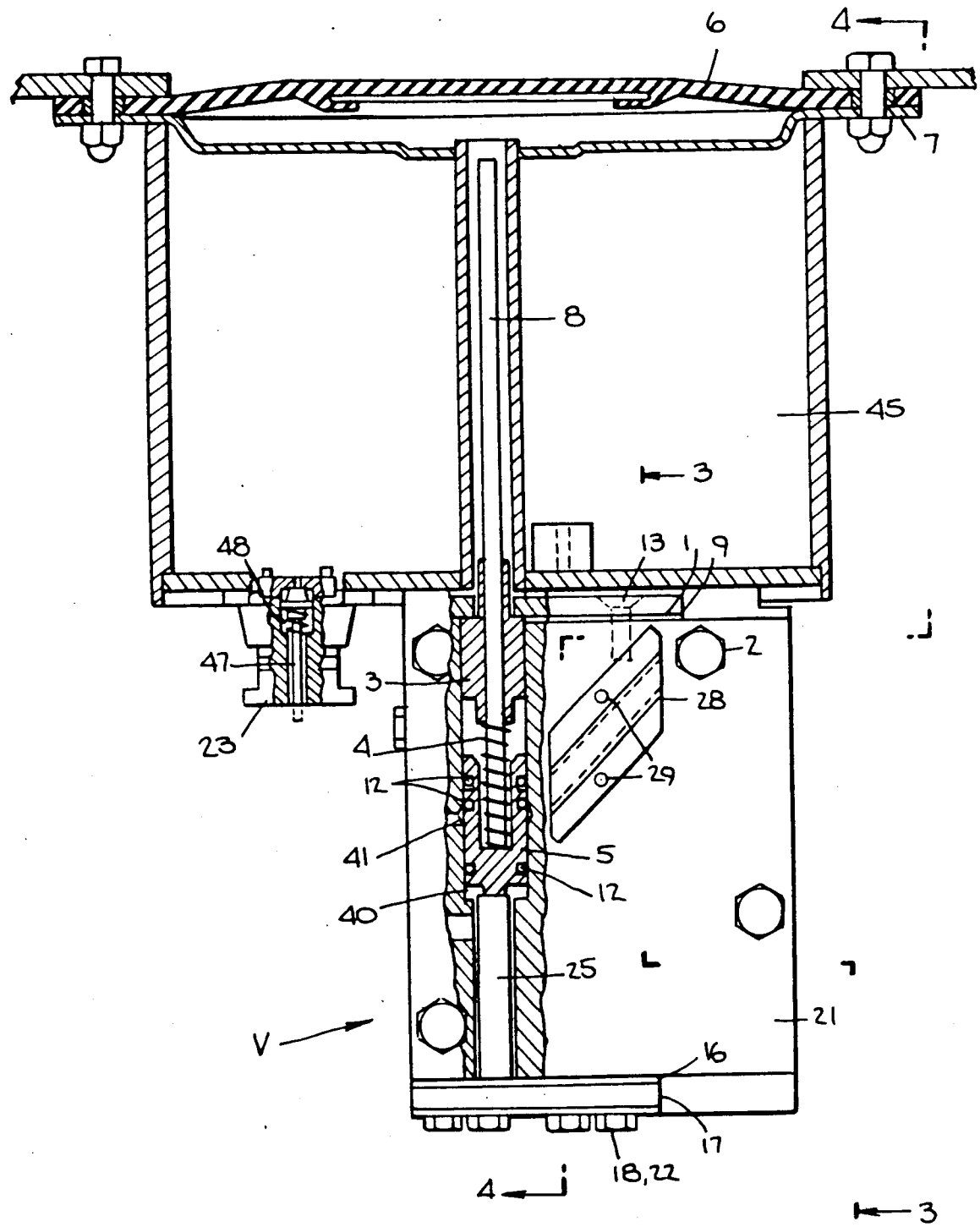
FIG. 2 is a partial section view of the valve body and one of the canister and load sensing devices, taken through the changeover spool area.

As the air pressure builds in the above-said cavities, changeover spool 5 is urged upward in FIG. 2, compressing its return spring 4. Since rod 8 is now free to travel upward until it contacts the elevated gasket assembly 6, spool 5 is free to travel sufficiently to permit the lower resilient seal 12 to pass over cavity 41 and thus admit air to enter the "light car" cavities 41, 42, 43, 44 and the canister chamber or reservoir 45.

As this pressure builds in the cavities 41–44 and channels, the proportioning spool 14 (FIG. 4) of a conventional type is urged downwardly against its spring 15 due to the spool 14 being of a differential area design, shown in FIG. 4, between its top portion in cavity 44 and its lower portion in cavity 37.

This downward movement of the proportioning spool 14 opens cavity 46 to communicate with cavity 37. The spool 14 thus loaded by air pressure on both top and bottom produces the desired proportional air brake charge to enter said cavity 37 and, by way of exit port 36, flows to the brake actuating cylinder. This air pressure has thus been reduced due to equalization with the properly sized canister volume 45 and proportioned by the influence of the proportioning spool 14 to produce the required reduced brake cylinder force for the light (unloaded) car and prevent sliding of the wheels on the car or particular car truck being influenced.

The valve thus loaded produces a method of visual indication of mode and function to the carman by way of the indicator plug 23 shown in FIG. 2. When the brake is applied and the canister thus charged in the empty (light) car condition, the indicator plunger is urged downward against its spring, producing a visible protrusion of the plunger stem from the housing 23, indicated by the phantom lines in FIG. 2.

Figure 3:
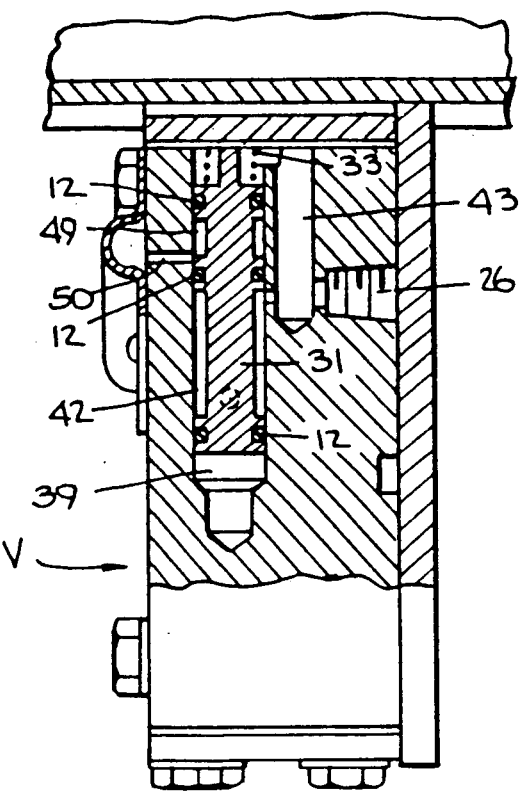
FIG. 3 is a partial section of the valve body taken at the release spool area, i.e. at section line 3—3 indicated in FIG. 2.
Figure 5:
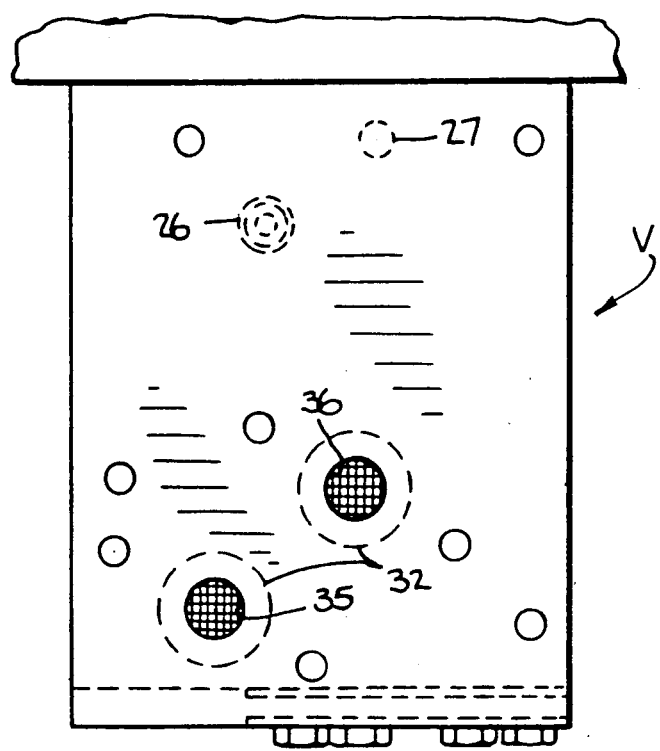
FIG. 5 is a rear view of the valve body showing the mounting plate surface and the inlet and outlet parts.

Release of the brake is also enhanced and accelerated by the unique action of the combination of the release spool 31 in FIG. 3 and the check valve 20 shown in FIGS. 3 and 4.

This release is initiated by the control valve being vented by means known to those skilled in the art, and releasing the air from the system through port 35. As the pressure is reduced in cavities 37, 38, 39 and 40, the combined action of loss of pressure on the bottom of the release spool 31 and said spool spring 33 urges the spool to move downward in FIG. 3, closing off "empty car" cavities 41, 42 and 43 from air communication with canister or reservoir air 45 and said 37, 38, 39 and 40 cavities. At the same time, said release spool 31 action opens communication with the canister volume 45, cavities 44, 43 and the vent 50 (FIG. 3) which vents the canister to atmosphere directly and does not require this volume to return completely through the empty/load valve, the feed pipe, standard control valve and venting system, thus producing shorter release time.

At the same time, the above said release action is taking place with the canister air charge, brake cylinder air is being initiated through the check valve 20 and pressure continues to drop in cavity 37 and related cavities. Further, as the canister air is vented to atmosphere, the pressure on the top of the proportional spool 14 in cavity 44 reduces sufficiently to permit the return spring 15 to move the said spool 14 upward in FIG. 4 permitting even more rapid exit of the brake cylinder air through cavity 37 and port 35 to be exhausted through the standard control valve known in the art.

The release spool 31 performs another function which improves the safety and serviceability of the system. The feed pipe which supplies the air to port 35 in the case of the invention or directly to the air brake cylinder in cases where the invention or other such device is not used, is prone to leakage in varying degrees. This leakage would normally directly reduce the applied brake cylinder force and thus the brake force during application.

In the above-disclosed invention, however, said spool 31 under "empty car" brake application has isolated the brake cylinder and related valve cavities from the feed pipe and port 35 and their related valve cavities. Further, since the pressure in cavity 43 and the top of spool 31 is less than the pressure in cavity 39 and the bottom of spool 31 due to the action of the proportioning spool 14, this isolation will remain until the leakage from the feed pipe system has reduced the pressure in cavity 39 to nearly match that in cavity 43.

When the above-described equalization occurs, the check valve 20 will then bleed air from the canister volume 45 into cavity 38, thus partially replacing the air lost from continued leakage of the feed pipe and its related systems, and will continue until the canister is depleted.

FIGS. 6–9 illustrate an embodiment of the invention in which the valve unit $V_1$ is equipped with a sensing arm but is otherwise the same as the valve unit V.

The reference numerals 51–69 in FIGS. 6–9 refer to the following parts:

| Reference Numeral | Part Description |
| --- | --- |
| 51 | Locknut |
| 52 | Arm |
| 53 | Contact Screw |
| 54 | Screw |
| 55 | Screw |
| 56 | Lockwasher |
| 57 | Screw |
| 58 | Upper Housing |
| 59 | Screw |
| 60 | Screw |
| 61 | Washer |
| 62 | Spring |
| 63 | Washer |
| 64 | Spacer |
| 65 | Hinge |
| 66 | Lower Housing |
| 67 | Piston |
| 68 | Link |
| 69 | Screw |

The embodiment shown in FIGS. 6–9 can be used where the load is to be measured by relative movement between car parts, such as movement between a bolster and a truck frame or between the car body and the truck.

In FIGS. 6–9, a sensing arm 70 for measuring the distance between car parts which are relatively movable by car load is pivotally secured to the valve body by a pivot mechanism within a housing 58. The arm 70 is secured to a pivotable hinge 65 having an arm 52 secured thereto. A link 68 interconnects the arm 52 with a piston 67 which engages a rod 8a, corresponding to the rod 8 shown in FIG. 2, for operating the changeover spool 5 as described in connection with FIGS. 1–5. Thus, the valve unit $V_1$ operates as described in connection with the valve V to control the brake pressure, the changeover spool of the unit being operable by the load sensing arm 70 rather than by the load sensing diaphragm 6 (FIG. 2).

It will be observed from the operation of the valves V and $V_1$ that neither the rod 8 nor the end of the arm 70 at the contact screw 53 need be continuously in contact with the member the position of which controls the valve V or $V_1$. Thus, such rod 8 or screw 53 needs to contact such member only when the brakes are applied.

Figure 10:
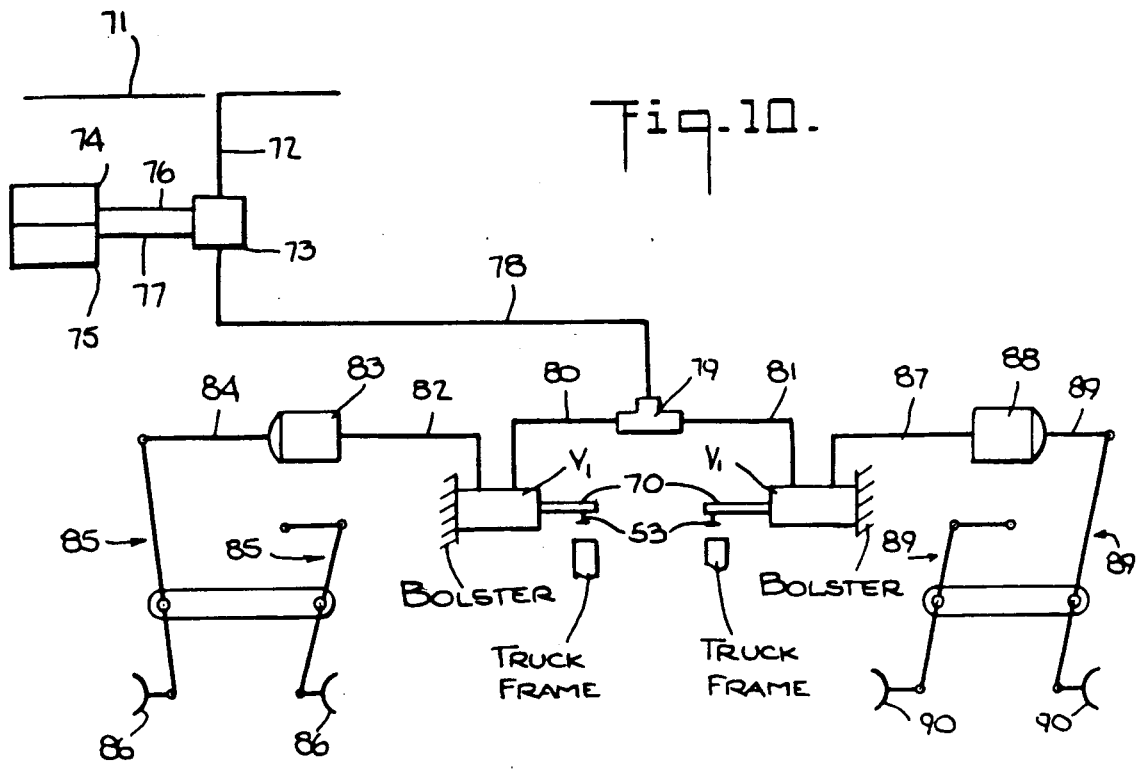
FIG. 10 is a diagrammatic illustration of the use of the valve of the invention in connection with the braking of individual trucks of a railway car.

As an example of an installation of the embodiment shown in FIGS. 6–9, reference is made to FIG. 10.

As shown in FIG. 10, the braking system of the invention utilizes pressurized air received from conventional equipment required on all freight cars under current regulations including conventional brake pipe 71, branch pipe 72, control valve 73 (ABDW valve), auxiliary and emergency reservoirs 74 and 75 and pipes 76 and 77 from the reservoirs to the control valve 73. Air pipe 78 communicates with conventional control valve 73 and with Tee 79 from which pipe 80 extends to sensor/changeover valve $V_1$ and from which pipe 81 extends to another sensor/changeover valve $V_1$. Sensor/changeover valve $V_1$ is mounted on the bolster associated with one truck and the other sensor/changeover valve $V_1$ is mounted on the bolster associated with another truck. Each of the sensor/changeover valves is mounted on its associated truck in the same way. Pipe 82 extends from sensor/changeover valve $V_1$ to brake cylinder 83. Piston rod 84 extends from cylinder 83 and operates levers 85 which force brake shoes 86 against the wheels of one truck. In the same manner, pipe 87 extends from the other sensor/changeover valve $V_1$ to brake cylinder 88. Piston rod 89 extends from cylinder 88 and operates levers which force brake shoes 90 against the wheel of the other truck.

The braking system described in conjunction with FIG. 10 applies braking action on an individual basis to each truck based on the load which is applied to the truck and which load is sensed by the individual air pressure sensor/changeover valve $V_1$ mounted on that truck. Thus, the braking action of each truck is separately controlled.

FIGS. 11–15 further illustrate the operation of the valves V and $V_1$. The proportional spool 14 is designed to control the brake cylinder pressure at 100% of the pressure generated by the ABDW type control valve pipe in loaded mode and approximately 60% in the empty mode due to the areas on top of the spool and underneath.

The changeover spool 5 is activated in the valve by either the lever 70 contacting the truck side frame or by the diaphragm 6 which moves to loaded position by the lading and returns to empty on the first brake application. The valves hold back nominally 16 psi of brake cylinder pipe pressure to assure brake shoe contact from a minimum brake application.

The release spool 31 serves to stabilize the valve when small leaks are experienced in the ABDW type valve or the pipe from the ABDW valve during empty car operation.

Figure 11:
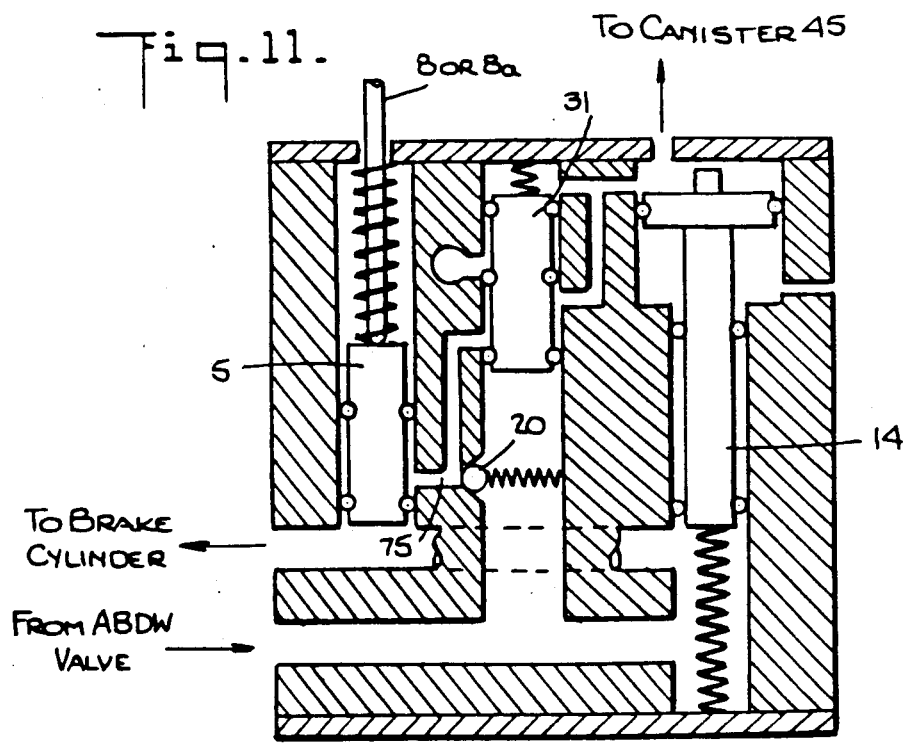
FIGS. 11-15 are schematic diagrams illustrating the operation of the valve unit of the invention.

FIG. 11 illustrates loaded car application of the brakes. Brake cylinder air from the ABDW valve enters the valve, and since proportional spool 14 is in the raised position, it flows directly to the brake cylinder. The changeover spool 5 is held closed by either the diaphragm 6, being held down by the commodity or the shorter travel of the sensor arm 70. Release spool 31 travels to the top position due to brake cylinder pressure under it.

Figure 12:
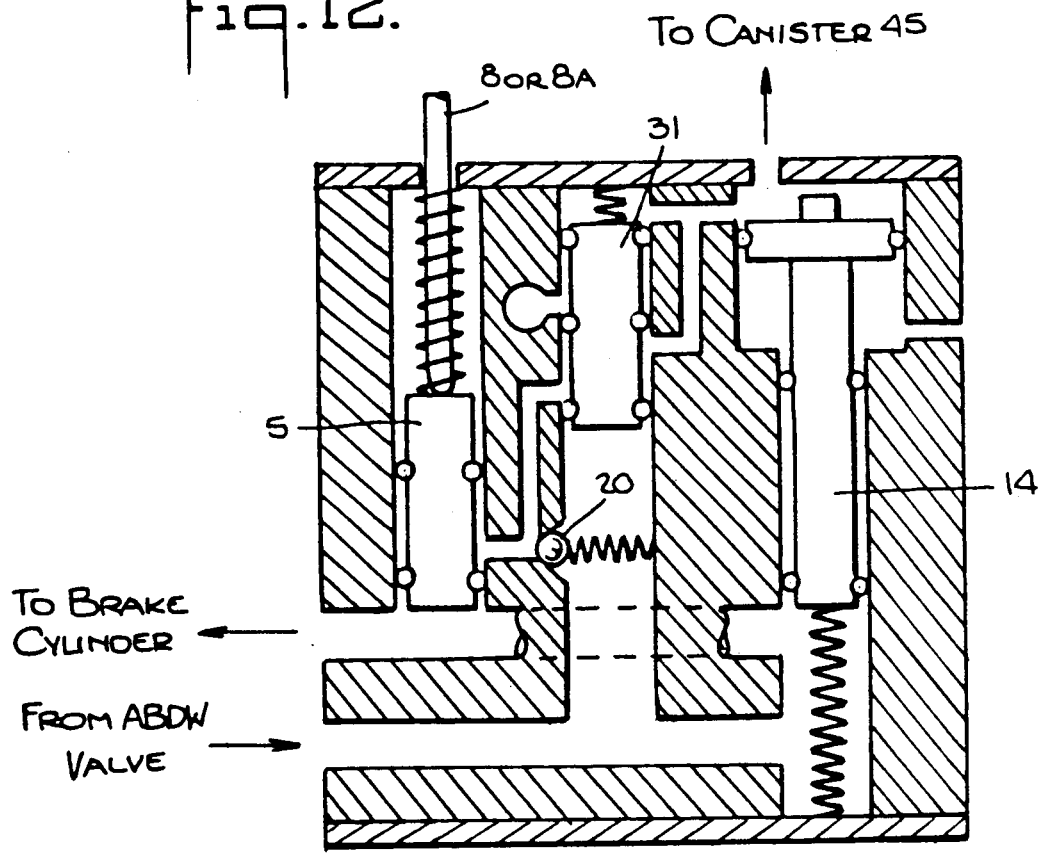

FIG. 12 illustrates the operation with release of the brakes of a loaded car. Due to brake cylinder air and the spring holding the proportional spool open, brake cylinder air flows under that spool to be exhausted by the ABDW type control valve and the retainer valve on the car.

Figure 13:
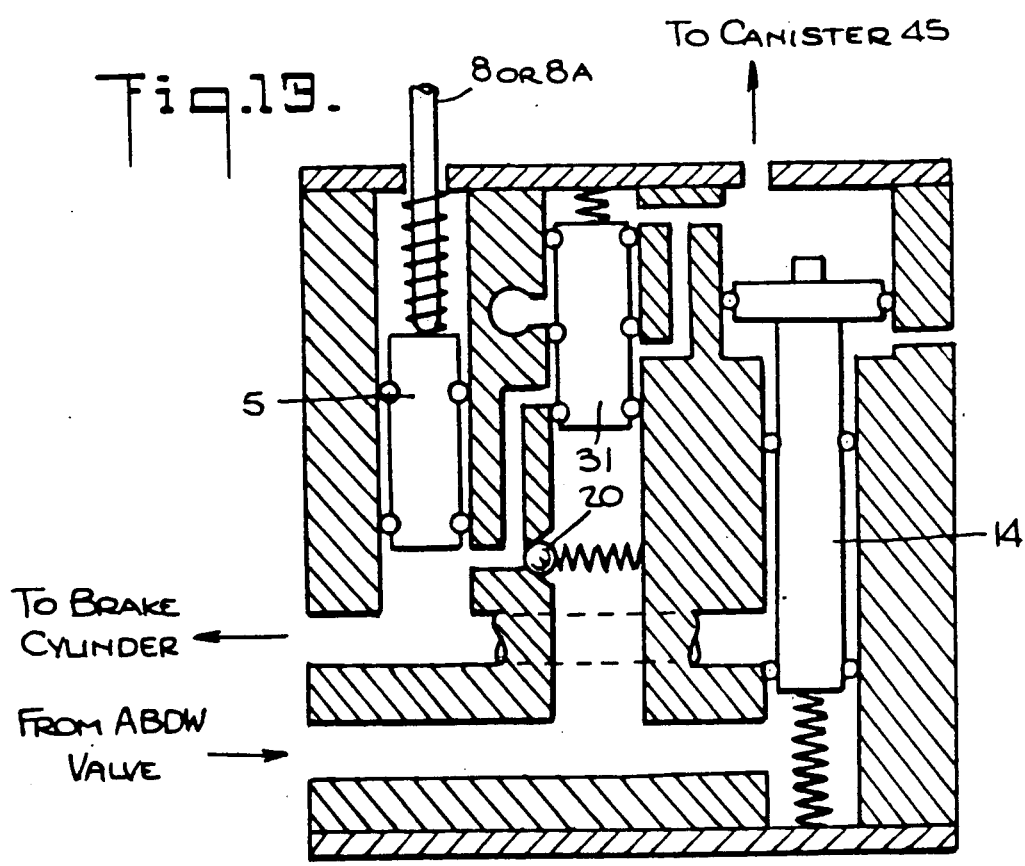

FIG. 13 illustrates empty car application of the brakes. At the beginning of any brake application air flows under the proportional valve 14 as with loaded car. At 16 psi the changeover spool 5 moves upward opening the passage to the release spool 31 which is held in applied position by ABDW pipe air pressure, around that spool, and on to the top of the proportional spool 14. The excess air is allowed to flow into the canister 45. It also flows to the top of the release spool 31, but it will not move because of higher ABDW pipe pressure under it.

When the pressure on top of the proportional spool 14, multiplied by the larger area, exceeds the ABDW pipe pressure under it, multiplied by the smaller area, the spool 14 moves down reducing the passage of air to the brake cylinder pipe. As the ABDW pipe pressure continues to mount, the valve 14 will move up again allowing more brake cylinder air which will again reduce the passage when the correct nominally 60% ratio is obtained.

Figure 14:
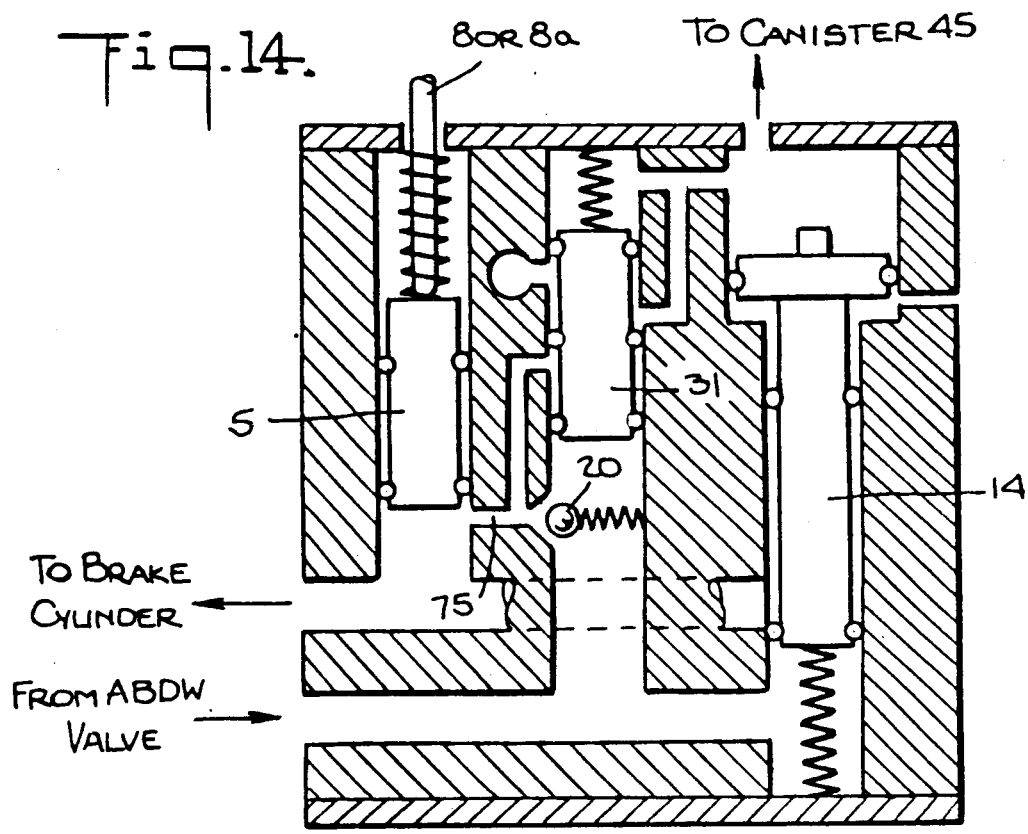

FIG. 14 illustrates the operation with the release of the brakes of an empty car ABDW pipe air is exhausted by the ABDW type control valve, the proportional spool 14 will be held closed by the control air pressure on top of it. When it reaches a lower pressure than the brake cylinder pipe, the check valve 70 will open allowing brake cylinder air to exhaust through the retainer in the normal manner.

As the ABDW pipe air under the release spool 31 reduces below control air on top of it, the release spool 31 will move down closing the port from the brake cylinder to the control air and releasing control air to atmosphere.

Figure 15:
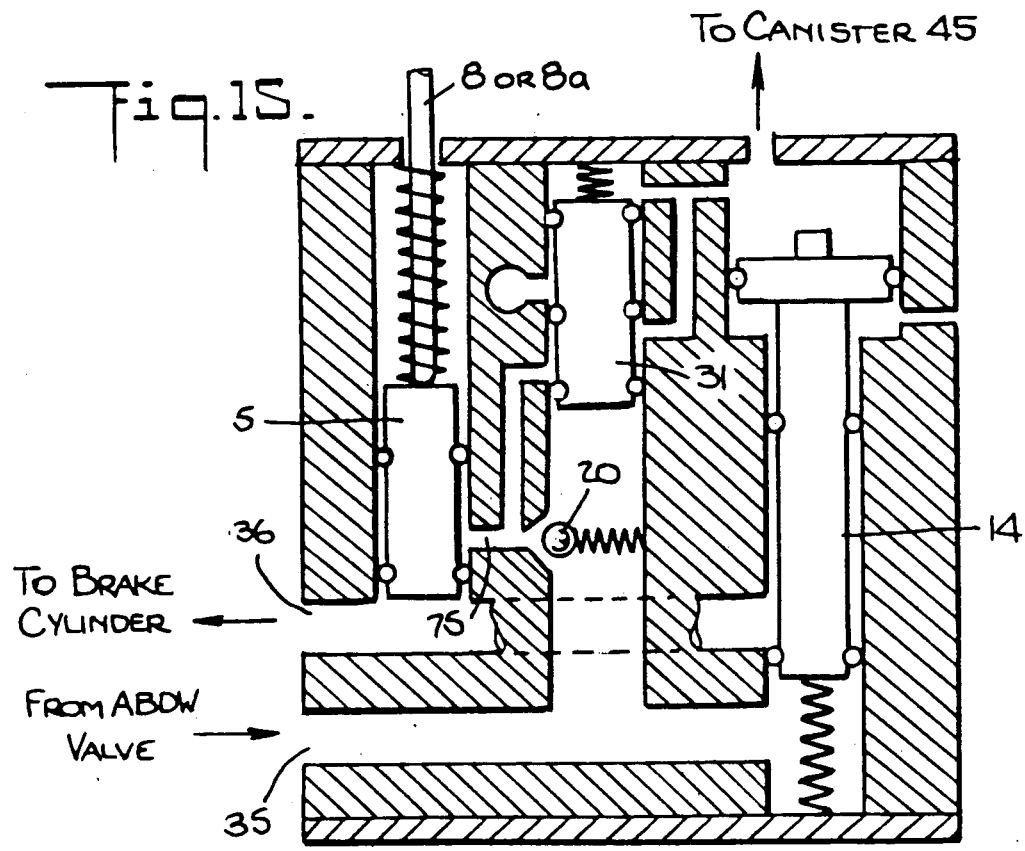

FIG. 15 illustrates the operation in empty mode when control valve is in "lap" position and a leak exists in the feed pipe and cavity under spool 31.

In the early stages of the leak, spool 5 will still be in the raised position providing communication between the brake cylinder and canister volume 45. As leak continues the pressure in the canister and brake cylinder is maintained until the pressure in cavity 35 falls below the canister and brake cylinder pressure. At this point, check valve 20 opens and permits air from the canister 45 and brake cylinder to replace the above said air pressure loss.

At some point in the leakage, the spring urging spool 5 downward overcomes the reduced pressure under spool 5, and said spool moves down and closes off port 75, closing off brake cylinder from further loss of pressure until air pressure in cavity 35 is depleted at which time a release is initiated.

Although preferred embodiments of the present invention have been described and illustrated, it will be apparent to those skilled in the art that various modifications may be made without departing from the principles of the invention.

We claim:

1. A railroad car comprising:
    a lading supporting body;
    at least one truck supporting said body, said truck having wheels and air operable braking apparatus including a brake cylinder for braking said wheels, said body having at least a first portion which is movable by said lading in accordance with the weight of said lading, one of said body and said truck having a second portion in relation to which said first portion is movable;
    a source of air under pressure;
    a control valve connected to said source of air for supplying air to said brake cylinder when it is desired to brake said wheels;
    and an empty/load valve unit connected intermediate said brake cylinder and said control valve for varying the braking force applied to said wheels so that the braking force is high when the weight of said lading is large and the braking force is less when the weight of said lading is relatively small, said empty/load valve unit comprising:
    a valve body having a sensing member extending therefrom and movable with respect to said valve body, said valve body being mounted on one of said first portion and said second portion with said sensing member engageable with the other of said first portion and said second portion whereby the sensing member is responsive to movement of said first portion relative to said second portion;
    said valve body having an inlet connected to said control valve for receiving air therefrom, an outlet connected to said brake cylinder for supplying air thereto and a first passageway extending from said inlet to said outlet;
    a proportional valve mounted at said first passageway with one side thereof at said first passageway for controlling the pressure of the air supplied to said brake cylinder; 'said valve body having a reservoir outlet and a second passageway extending from said first passageway to said reservoir outlet and to the opposite side of said proportional valve;
    a changeover valve mounted in said valve body at said second passageway and mechanically and directly connected to and operable by said sensing member for diverting air from said first passageway to said second passageway under control of said sensing member whereby when the weight of the lading is large, air is not diverted to said reservoir outlet and when the weight of the lading is small or zero, air is diverted to said reservoir outlet; and
    valve means in said valve body responsive to the pressures of the air in said first passageway and said second passageway for exhausting air from said first passageway and said second passageway upon the discontinuance of the supply of air to said inlet; and a reservoir connected to said reservoir outlet for receiving air diverted from said first passageway.

2. A railroad car as set forth in claim 1 wherein said first portion is a diaphragm mounted on a wall of said supporting body engageable by said lading.

3. A railroad car as set forth in claim 1 wherein said supporting body includes a bolster and said truck includes a frame, said bolster being supported from said truck by springs and wherein said first portion is on said bolster and said valve body is mounted on said first portion and said second portion is on said frame.

4. A railroad car as set forth in claim 1 wherein said changeover valve is movable by air supplied to said inlet and moves said sensing member into engagement with the portion with which it is engageable.

5. A railroad car as set forth in claim 1 wherein said proportional valve is intermediate said inlet and the first-mentioned said outlet, said changeover valve is intermediate said first passageway and said second passageway and said valve means for exhausting air comprises a check valve interconnecting said inlet and a portion of said second passageway intermediate said changeover valve and said reservoir outlet and permitting air to flow from said portion of said second passageway to said inlet whenever the air pressure at said portion of said second passageway is greater than the air pressure at said inlet.

6. A railroad car as set forth in claim 1 wherein said reservoir is secured to said valve body.

7. A railroad car as set forth in claim 1 wherein said reservoir has an indicator member externally of said reservoir and operable in accordance with the air pressure in said reservoir for indicating the pressure of the air in said reservoir.

8. A railroad car as set forth in claim 7 wherein said indicator member is a piston extendable from said reservoir.

9. An empty/load valve comprising:
a valve body having a sensing member extending therefrom;
said valve body having an air inlet for connection to a control valve for receiving air therefrom, an air outlet for connection to a brake cylinder for supplying air thereto and a first passageway extending from said inlet to said outlet;
a proportional valve mounted at said first passageway with one side thereof at said first passageway for controlling the pressure of the air supplied to said air outlet;
said valve body having a reservoir outlet and a second passageway extending from said first passageway to said reservoir outlet and to the opposite side of said proportional valve;
a changeover valve mounted in said body at said second passageway and mechanically and directly connected to and operable by said sensing member for diverting air from said first passageway to said second passageway under control of said sensing member whereby in one position of said sensing member, air is not diverted to said reservoir outlet and in another position of said sensing member, air is diverted to said reservoir outlet; and
valve means in said body responsive to the pressures of the air in said first passageway and said second passageway for exhausting air from said first passageway and said second passageway upon the discontinuance of the supply of air to said inlet; and
a reservoir connected to said reservoir outlet for receiving air diverted from said first passageway.

10. An empty/load valve unit as set forth in claim 9 wherein said changeover valve is movable by air supplied to said inlet and moves an end of said sensing member away from said valve body.

11. An empty/load valve unit as set forth in claim 9 wherein said proportional valve is intermediate said inlet and the first-mentioned said outlet, said changeover valve is intermediate said first passageway and said second passageway and said means for exhausting air comprises a check valve interconnecting said inlet and a portion of said second passageway intermediate said changeover valve and said reservoir outlet and permitting air to flow from said portion of said second passageway to said inlet whenever the air pressure at said portion of said second passageway is greater than the air pressure at said inlet.

12. An empty/load valve unit as set forth in claim 9 wherein said reservoir is secured to said valve body.

13. An empty/load valve unit as set forth in claim 9 wherein said reservoir has an indicator member externally of said reservoir and operable in accordance with the air pressure in said reservoir for indicating the pressure of the air in said reservoir.

14. An empty/load valve unit as set forth in claim 13 wherein said indicator member is a piston extendable from said reservoir.

15. A railroad car comprising:
a lading supporting body;
at least one truck supporting said body, said truck having wheels and air operable braking apparatus including a brake cylinder for braking said wheels, said body having at least a first portion which is movable by said lading in accordance with the weight of said lading, one of said body and said truck having a second portion in relation to which said first portion is movable;
a source of air under pressure;
a control valve connected to said source of air for supplying air to said brake cylinder when it is desired to brake said wheels;
and an empty/load valve unit connected intermediate said brake cylinder and said control valve for varying the braking force applied to said wheels so that the braking force is high when the weight of said lading is large and the braking force is less when the weight of said lading is relatively small, said empty/load valve unit comprising:
a valve body having a sensing member extending therefrom and movable with respect to said valve body, said valve body being mounted on one of said first portion and said second portion with said sensing member engageable with the other of said first portion and said second portion whereby the sensing member is responsive to movement of said first portion relative to said second portion;
said valve body having an inlet connected to said control valve for receiving air therefrom, an outlet connected to said brake cylinder for supplying air thereto and a first passageway extending from said inlet to said outlet;
a proportional valve mounted at said first passageway with one side thereof at said first passageway for controlling the pressure of the air supplied to said brake cylinder;
said valve body having a reservoir outlet and a second passageway extending from said first passageway to said reservoir outlet and to the opposite side of said proportional valve;
a changeover valve mounted at said second passageway and connected to said sensing member for diverting air from said first passageway to said second passageway under control of said sensing member whereby when the weight of the lading is large, air is not diverted to said reservoir outlet and when the weight of the lading is small or zero, air is diverted to said reservoir outlet; and said valve body having an exhaust outlet and means in said valve body for exhausting air from said first passageway and said second passageway upon the discontinuance of the supply of air to said inlet comprising an exhaust valve mounted in said second passageway intermediate said changeover valve and said proportional valve for diverting air from said second passageway to said exhaust outlet upon release of the truck brakes.

16. An empty/load valve unit comprising:

a valve body having a sensing member extending therefrom;

said valve body having an air inlet for connection to a control valve for receiving air therefrom, an air outlet for connection to a brake cylinder for supplying air thereto and a first passageway extending from said inlet to said outlet;

a proportional valve mounted at said first passageway with one side thereof at said first passageway for controlling the pressure of the air supplied to said air outlet;

said valve body having a reservoir outlet and a second passageway extending from said first passageway to said reservoir outlet and to the opposite side of said proportional valve;

a changeover valve mounted at said second passageway and connected to said sensing member for diverting air from said first passageway to said second passageway under control of said sensing member whereby dependent upon the position of said sensing member, air is not diverted to said reservoir outlet or air is diverted to said reservoir outlet; and said valve body having an exhaust outlet and means in said body for exhausting air from said first passageway and said second passageway upon the discontinuance of the supply of air to said inlet comprising an exhaust valve mounted in said second passageway intermediate said changeover valve and said proportional valve for diverting air from said second passageway to said exhaust outlet upon loss of air pressure at said inlet and a reservoir connected to said reservoir outlet for receiving air diverting from said first passageway.

* * * * *